(No Model.) 3 Sheets—Sheet 1.

J. W. HUDSON.
MOLDING MACHINE.

No. 297,403. Patented Apr. 22, 1884.

Attest:
W. H. H. Knight
H. J. Bernhard

Inventor:
John W. Hudson
per Edson Bros.
Attorneys (No Model.) 3 Sheets—Sheet 2.

J. W. HUDSON.
MOLDING MACHINE.

No. 297,403. Patented Apr. 22, 1884.

Attest.
W. H. H. Knight
W. Bernhard

Inventor:
J. W. Hudson
per Edson Bros.
Attorneys (No Model.) 3 Sheets—Sheet 3.

J. W. HUDSON.
MOLDING MACHINE.

No. 297,403. Patented Apr. 22, 1884.

Attest
W. H. H. Knight
H. Bernhard

Inventor:
John W. Hudson
per Edson Bros,
Attorneys

N. PETERS, Photo-Lithographer, Washington, D. C.

UNITED STATES PATENT OFFICE.

JOHN W. HUDSON, OF WELLINGTON, ILLINOIS.

MOLDING-MACHINE.

SPECIFICATION forming part of Letters Patent No. 297,403, dated April 22, 1884.

Application filed February 29, 1884. (No model.)

*To all whom it may concern:*

Be it known that I, JOHN W. HUDSON, a citizen of the United States, residing at Wellington, in the county of Iroquois and State of Illinois, have invented certain new and useful Improvements in Wood-Shaping Machines; and I do declare the following to be a full, clear, and exact description of the invention, such as will enable others skilled in the art to which it appertains to make and use the same, reference being had to the accompanying drawings, and to the letters and figures of reference marked thereon, which form part of this specification.

My invention relates to a machine for finishing irregular forms, designed as an improvement upon the device patented to me December 5, 1882, and numbered 268,405; and the novelty consists in the construction and arrangement of parts, as will be more fully hereinafter set forth, and specifically pointed out in the claims.

In the device above mentioned a table was provided with cam-slots, in which slots operated revolving cutter-heads which had vertical play and such lateral play as the cam-slots compelled. The blank to be operated upon was secured upon the table, and as the table moved in one direction the cutters and finishers gave the desired form to the blank. The table had then to be moved idly back in order to treat another blank.

In the present invention I form an endless table in sections, and so arrange the cam-slots that the blanks may be placed in position and operated upon continuously, the finished articles being deposited at one end of the machine as soon as finished.

The invention consists, essentially, in the construction and arrangement of this endless table in oval boxes which traverse the cam-slots, and in which the spindles of the cutter-heads revolve, and in other features of construction, arrangement, and adaptation, all as will be more fully hereinafter set forth.

For convenience I will only illustrate and describe in this specification such parts as are necessary to a full understanding of novel features claimed, the details of other points being sufficiently covered in the patent hereinbefore referred to.

Figure 1:
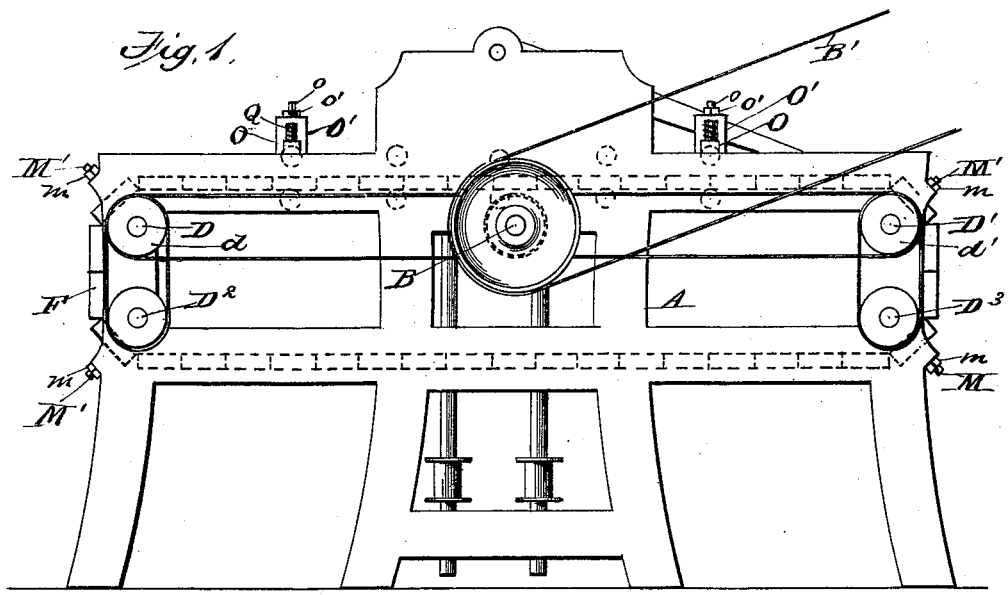
Figure 2:
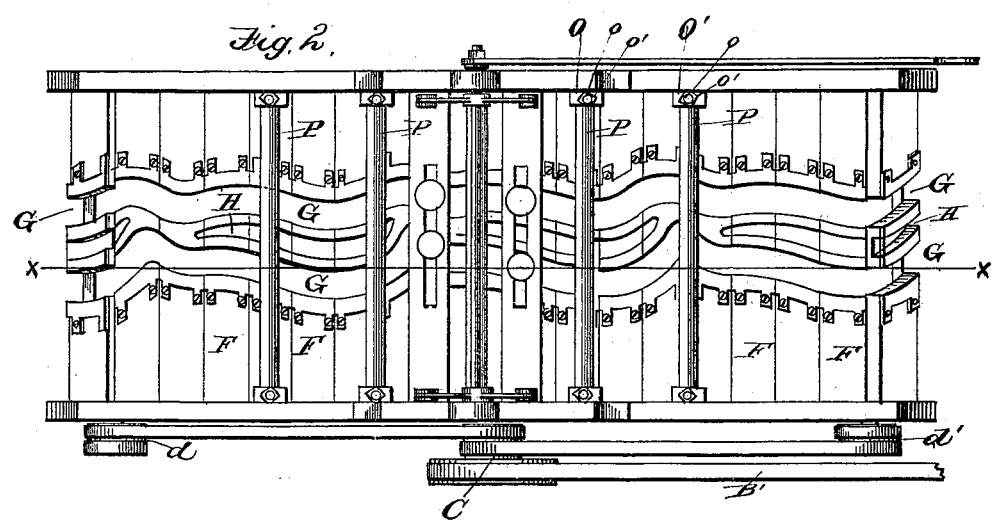
Figure 3:
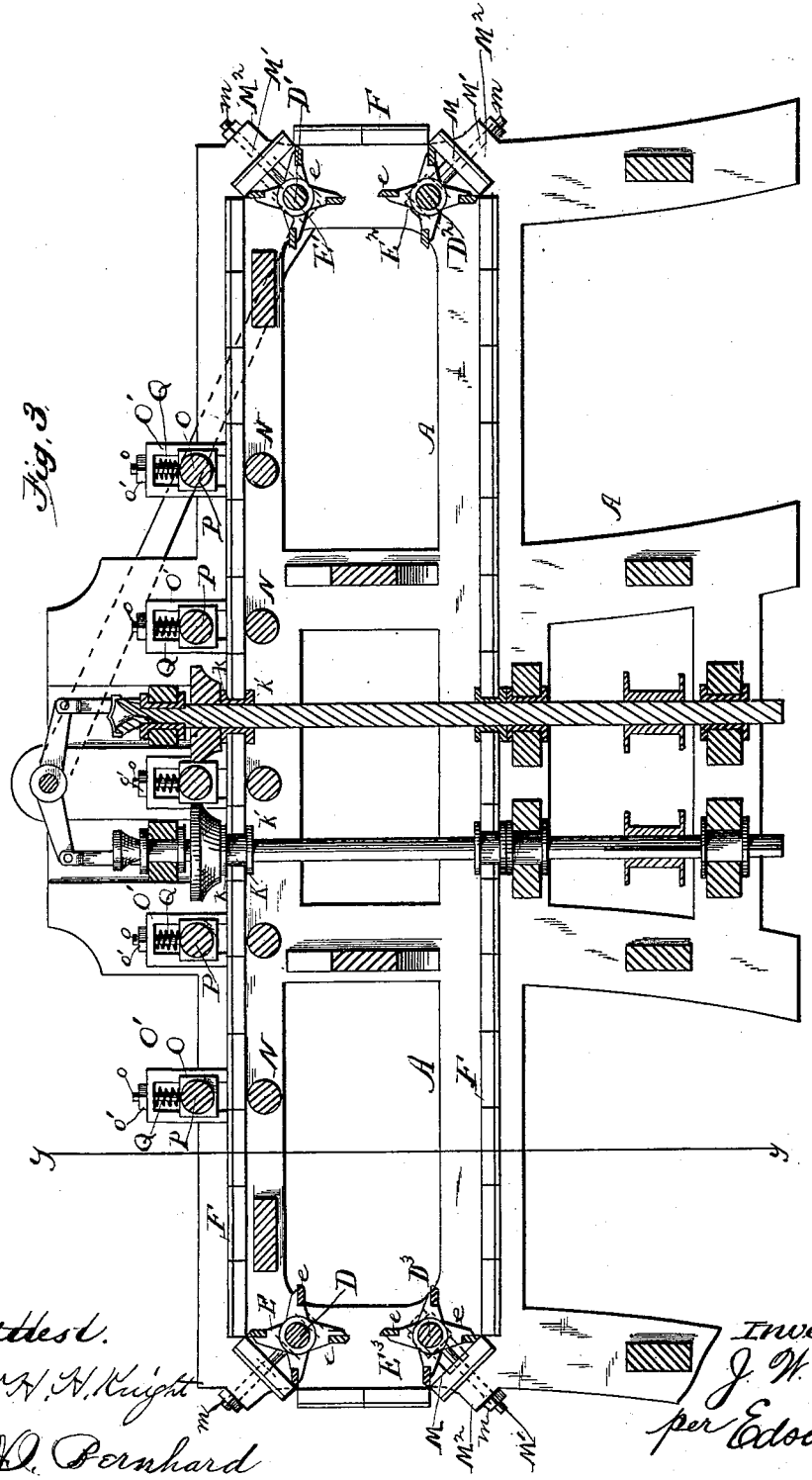
Figure 4:
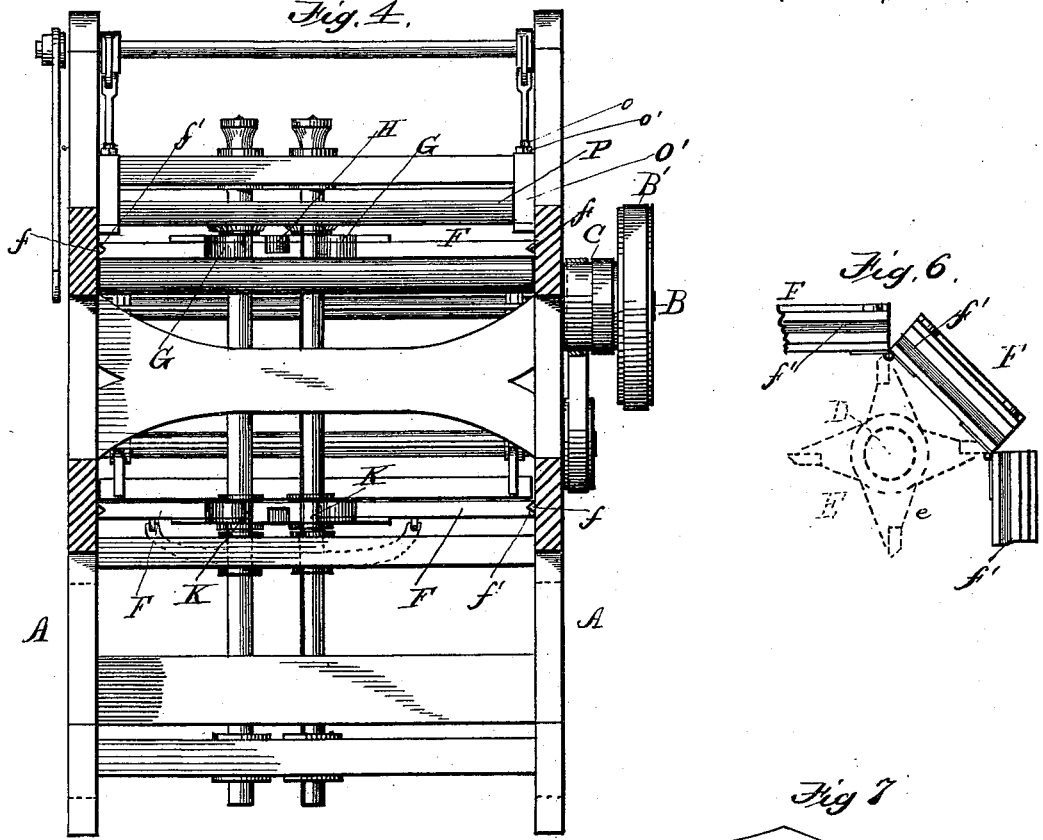
Figure 6:
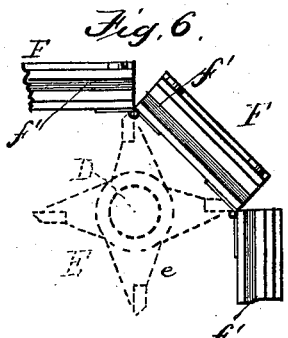
Figure 7:
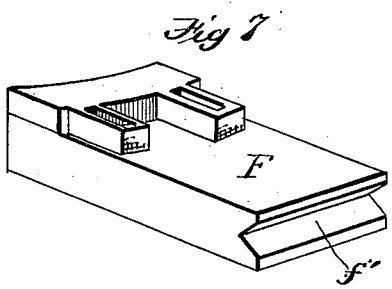
Figure 5:
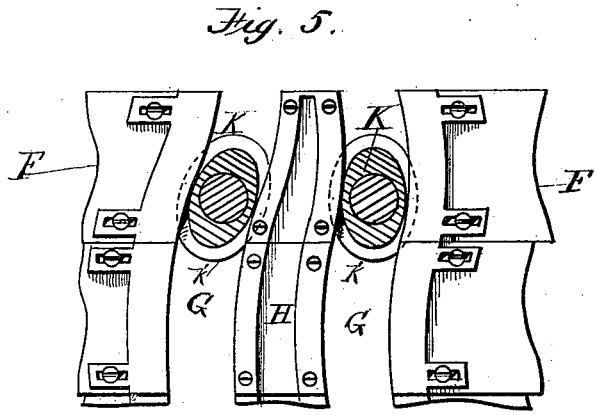

The invention is illustrated in the accompanying drawings, which form a part of this specification, and in which Figure 1 is a side elevation of a machine embodying my improvements. Fig. 2 is a top plan view thereof. Fig. 3 is a transverse section on the line $x\ x$ of Fig. 2. Fig. 4 is a vertical section on the line $y\ y$ of Fig. 3. Fig. 5 is an enlarged view of a portion of the table, showing the oval boxes and their relation to the cam-slots. Fig. 6 is a detail view of a portion of the table, showing its relation to the fan-shaped sprocket-wheels. Fig. 7 is a detail view of a portion of one of the sections of which the table is composed.

Referring to the drawings, in which like letters of reference denote like parts in all the figures, A designates the frame, in which is journaled the power-shaft B, having proper connections, B', with a suitable power, (not shown,) and carrying also a double pulley, C, one portion of which is belted to a pulley, $d$, on a shaft, D, of a fan-wheel, E, and the other to a pulley, $d'$, upon the shaft D' of the fan-wheel E'. These fan-wheels E and E' are located at the forward and rear ends of the frame, respectively, and their shafts carry pulleys $d^2$ and $d^3$, which connect by belts with the shafts $D^2\ D^3$ of the fan-shaped sprocket-wheels $E^2\ E^3$, located beneath the fan-wheels E and E'. These connecting-pulleys are of such corresponding size as to impel all the fan-shaped sprocket-wheels E E' $E^2\ E^3$ in the same direction with the same speed, the purpose of which will be presently set forth.

Upon the inner surface of the upper rails of the frame A are V-shaped projections $f$, which serve as guides in a groove, $f'$, formed in the ends of the sections F of the endless table. These sections are loosely hinged together, and each section is of a width corresponding to the reach between the arms $e$ of the fan-shaped sprocket-wheels, over which the endless table is carried. As the table passes either fan-wheel, it necessarily makes a short bend at its hinge, and the arms $e$, acting upon the angle thus formed, serves to propel the table in the manner of a chain and sprocket. The upper surface of the endless table is provided with a series of cam-slots, G, and grooves H, for clamping the blank, these clamps H being of any approved construction and arranged in such manner that they shall be equidistant from each other. The cutter-spindles in their arrangement and functions are similar to those of the patent hereinbefore mentioned, and operate in boxes K, having an upper flange, k, which rests upon or traverses the upper edge of the cam-slots, and flange k', which serves similarly upon the lower surfaces of the table, the shank or body traversing the slot. This shank is made oval, or in the form of an ellipse in cross-section, which form is peculiarly adapted to its service in the cam-slots.

In order to keep up a proper tension upon the table, and to insure its proper register of action by the arms e of the fan-shaped sprocket-wheels, the shafts D D', &c., of those wheels are journaled in movable boxes M, and these boxes M may be adjusted outwardly, by means of threaded rods M' and nuts m, the rods being rigid with the boxes and extending through the pockets M², as shown in Fig. 2. The finishing operation is only being accomplished when the upper horizontal portion of the endless table is passing in proximity to the cutters. To insure a proper bearing at such times upon the work, I arrange a series of carrying-rolls, N, journaled in the upper side rails of the frame, and these rolls support the table when it is passing upon its upper horizontal path. Above the table, in movable boxes O, are journaled pressure-rolls P, which serve to hold the work or blank firmly in position until the shaping is finished. These boxes O operate in frames O', and may be adjusted up or down by rod o and nut o', to give more or less pressure upon the work from the springs Q, as may be required. These pressure-rollers P are arranged, preferably, two upon either side of the cutters and one between the rough cutter of each set. When, in the progress of the table, a clamping-place, H, appears, a blank is put in position, and it immediately passes under the pressure-rolls P and is properly shaped by the cutters. As soon as the table passes over the wheel E', the finished article is released and is deposited at the end of the machine.

As in the patent cited, the invention is especially adapted to the formation of hames, and the cam-slots may be readily arranged to have the blanks finished rights and lefts, to fit either side of the collar.

The operation of the spindles and cutters in their vertical and lateral movements is the same as in the patent cited, and forms no part of this invention.

Modifications in details of construction may be made without departing from the principle or sacrificing the advantages of my invention, the essential features of which will be readily understood from the foregoing description, taken in connection with the accompanying drawings.

What I claim as my invention, and desire to secure by Letters Patent of the United States, is—

1. In a machine for finishing irregular forms, and in combination with revolving cutters, an endless traveling table, constructed as herein described, having hinged sections extending from side to side of the machine, and provided with cam-slots that determine the position of the cutters, as and for the purpose set forth.

2. In combination with an endless table, as described, and with cutters directed by cam-slots in such table, boxes in which the cutter-spindles are journaled, having flanges, as k k', and oval shanks which traverse the said slots, as set forth.

3. In a machine for finishing irregular forms, the combination of the endless traveling table composed of hinged sections which extend from side to side of the machine, and are provided with slots, as described, with fan-wheels E E' E² E⁴, and means, substantially as described, whereby said table is operated and the tension thereof adjusted at will, as and for the purpose set forth.

4. In a machine for finishing irregular forms, the combination of the fan-wheels mounted in adjustable boxes, as described, with the endless traveling table composed of hinged sections extending from side to side of the machine, and provided with slots that direct the position of the cutters, and means, substantially as described, for operating the fan-wheels and table, as and for the purpose set forth.

5. In a machine for finishing irregular forms, the fan-wheels, constructed substantially as described, journaled in adjustable boxes and adapted to be rotated in the same direction and at equal speed, in combination with the endless traveling table having hinged sections extending from side to side of the machine, and provided with two slots having irregular sides, to direct the position of the revolving cutters, and means for operating said fan-wheels, the endless table, and revolving cutters, as and for the purpose set forth.

6. In a machine for finishing irregular forms, the combination of an endless traveling table having hinged sections extending from side to side of the machine, and provided with slots for determining the position of the revolving cutters, and provided with grooves wherein the articles to be finished are placed and held, in combination with the revolving cutters, adjustable fan-wheels, and means, substantially as described, whereby motion is imparted to said endless table, revolving cutters, and adjustable fan-wheels, as set forth.

7. In a machine for finishing irregular forms, the combination of an endless traveling table composed of hinged sections extending from side to side of the machine, and provided with slots and a groove, for the purpose described, with a series of rolls placed below and supporting said table, and means, substantially as described, for operating said table, as and for the purpose set forth.

8. In a machine for finishing irregular forms, an endless table composed of hinged sections extending from side to side of the machine, and provided with slots and a groove, as described, in combination with a bearing-roll placed below the table, and spring-pressure rolls placed above such table, substantially as described, and for the purpose set forth.

9. A machine for finishing irregular forms, consisting of the following elements, to wit: an endless traveling table composed of hinged sections F, extending from side to side of a frame, A, provided with irregular slots G, for determining the position of the cutter-spindles, and grooves H, for the reception of the blanks, said table operated by fan-wheels E E' $E^2$ $E^3$, journaled in boxes M, which are adjusted by rods M' and nuts $m$, and rotated by pulleys $d$ $d'$ $d^2$ $d^3$ upon their shafts, carrying rolls N, located below the table, adjustable spring-pressure rolls located above the table, and the driving-pulley, all combined and operating substantially as herein described.

In testimony whereof I affix my signature in presence of two witnesses.

JOHN W. HUDSON.

Witnesses:
FRED OCHSMAN,
JOHN F. COWAN.